(12) United States Patent
Kuo et al.

(10) Patent No.: US 8,330,900 B2
(45) Date of Patent: Dec. 11, 2012

(54) DISPLAY DEVICE WITH MULTIPLE DISPLAY MODULES

(75) Inventors: Han-Ping Kuo, Hsin-Chu (TW);
Chia-Hao Wu, Hsin-Chu (TW);
Chih-Yen Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 483 days.

(21) Appl. No.: 12/768,644

(22) Filed: Apr. 27, 2010

(65) Prior Publication Data
US 2010/0277665 A1   Nov. 4, 2010

(30) Foreign Application Priority Data

Apr. 30, 2009   (TW) ............................... 98114449 A

(51) Int. Cl.
*G02F 1/133*   (2006.01)
*G09G 5/00*   (2006.01)
(52) U.S. Cl. .......................................... 349/73; 345/1.3
(58) Field of Classification Search ................ 349/73; 345/1.3
See application file for complete search history.

(56) References Cited

U.S. PATENT DOCUMENTS

| 6,262,785 | B1 * | 7/2001 | Kim ................................ 349/58 |
| 7,817,357 | B2 * | 10/2010 | Mitani et al. .................. 359/802 |
| 2003/0189759 | A1 * | 10/2003 | Kim et al. ...................... 359/619 |

OTHER PUBLICATIONS

English language translation of abstract of TW 235905, Jul. 11, 2005.
English language translation of abstract of TW 255485, Jan. 11, 2005.

\* cited by examiner

*Primary Examiner* — Wen-Ying P Chen
(74) *Attorney, Agent, or Firm* — McClure, Qualey & Rodack, LLP

(57) ABSTRACT

A display device including a first prism sheet, a second prism sheet disposed side by side with the first prism sheet, a first display module, and a second display module is provided. The first display module is disposed beneath the first prism and has a first display surface. At least a portion of the first display surface close to the second prism sheet is inclined toward the second prism sheet and forms a first angle with respect to the first prism sheet. The second display module is disposed beneath the second prism sheet and has a second display surface. At least a portion of the second display surface closed to the first prism sheet is inclined toward the first prism sheet and forms a first angle with respect to the second prism sheet.

21 Claims, 6 Drawing Sheets

DISPLAY DEVICE WITH MULTIPLE DISPLAY MODULES

This application claims priority based on a Taiwanese Patent Application No. 098114449, filed on Apr. 30, 2009, the disclosure of which is incorporated herein by reference in its entirety.

BACKGROUND OF THE INVENTION

1. Field of the Invention

The present invention relates to a display device with multiple display modules. Particularly, the present invention relates to a display device with multiple display modules having minimized borders in between.

2. Description of the Related Art

Although the available sizes of display modules and display panels are increased with the progress of techniques, the costs of larger-sized display modules and display panels are still too high resulting in the limitation to popularity. For the purpose of enlarging the display area, combining dual or multiple display modules to form an integrated display surface becomes a possible alternative measure. Besides, in some products, dual display modules can be employed to increase the design variety. For instance, two display modules can be combined to display a larger image or can be respectively used to display different images.

FIG. 1A and FIG. 1B show a conventional electronic device with dual display modules. As shown in FIG. 1A, the electronic device includes a left housing 10 and a right housing 20. The left housing 10 and the right housing 20 have a left screen 11 and a right screen 21, respectively. As shown in FIG. 1B, the left housing 10 includes a left display module 31 which displays images through the left screen 11. The right housing 20 includes a right display module 32 which displays images through the right screen 21. Because the left display module 31 and the right display module 32 both have a frame 50 disposed around, their display areas are both restricted by the frames 50 and therefore are non-extendible. In other words, as shown in FIG. 1A and FIG. 1B, a border 70 exists between the images shown on the left screen 11 and the right screen 21. Hence, when the left screen 11 and the right screen 21 are combined to show an image, the image will be separated into two portions by the border 70, consequently obstructing users' viewing feeling.

SUMMARY OF THE INVENTION

It is an objective of the present invention to provide a display device with multiple display modules which minimizes a border between adjoining display modules.

It is another objective of the present invention to provide a display device with multiple display modules which provides a better viewing feeling to users when different display modules are combined to display an image cooperatively.

The display device of the present invention includes a first prism sheet, a second prism sheet, a first display module, and a second display module. The first prism sheet and the second prism sheet are disposed side by side to combine as an integrated display surface. The first display module is disposed beneath the first prism sheet and has a first display surface. At least a portion of the first display surface close to the second prism sheet is inclined toward the second prism sheet and forms a first angle with respect to the first prism sheet. The second display module is disposed beneath the second prism sheet and has a second display surface. At least a portion of the second display surface close to the first prism sheet is inclined toward the first prism sheet and forms a second angle with respect to the second prism sheet.

Since the portion of the first display surface close to the second prism sheet is inclined toward the second prism sheet, the display beams from the portion are also inclined toward the second prism sheet along the direction of the normal line. When the inclined display beams reach the first prism sheet, the first prism sheet directs the inclined display beams back to an angle close to the direction of the normal line of the first prism sheet through refraction. Likewise, since the portion of the second display surface close to the first prism sheet is inclined toward the first prism sheet, the display beams from the portion are also inclined toward the first prism sheet along the direction of the normal line. When the inclined display beams reach the second prism sheet, the second prism sheet directs the inclined display beams back an angle close to the direction of the normal line of the second prism sheet through refraction. Through this design, the border between the first display module and the second display module can be minimized to centralize the images displayed on the first display surface and the second display surface, so as to reduce the obstruction to users' viewing.

DETAILED DESCRIPTION OF THE PREFERRED EMBODIMENT

The present invention provides a display device with multiple display modules. When the display modules are combined to display images cooperatively, the border between adjoining display modules can be minimized to reduce the obstruction to users' viewing. The display device preferably includes the image-display or text-display screen of handheld electronic devices. The handheld electronic device may include a mobile phone, a personal digital assistant (PDA), a handheld game console, a digital camera, or the likes. However, in other embodiments, the display device of the present invention can be applied to larger-sized electronic devices such as liquid crystal televisions, liquid crystal screens for personal computer or notebook computer, television wall, etc.

Figure 1A:
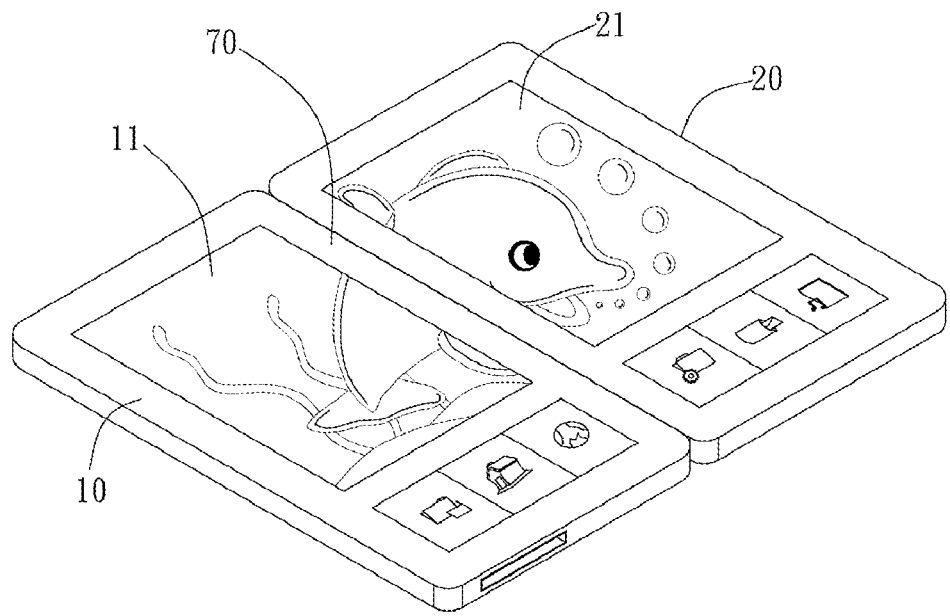
FIG. 1A and FIG. 1B are schematic views of a conventional electronic device with dual display modules.
Figure 1B:
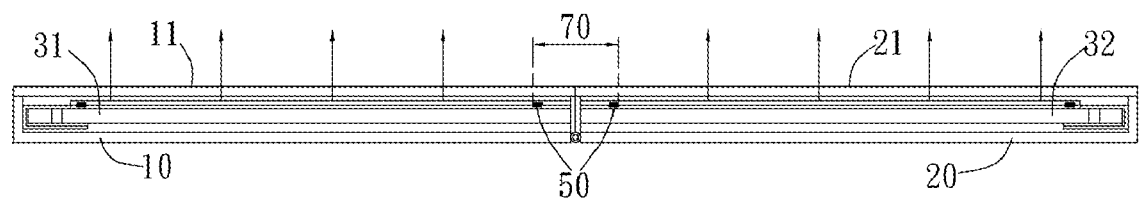
Figure 2A:
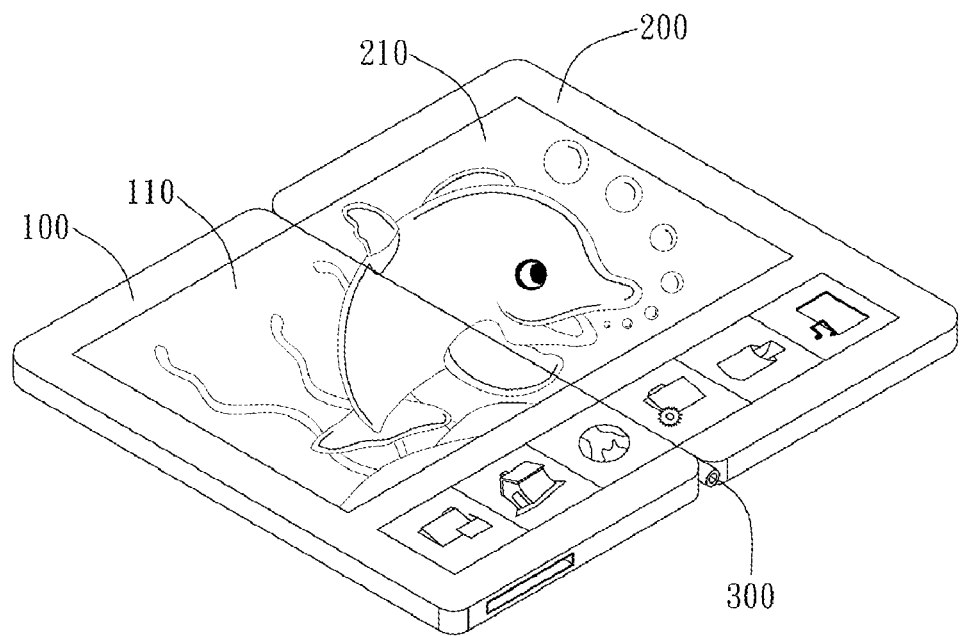
FIG. 2A is a schematic view of an embodiment of the display device of the present invention in an open configuration.
Figure 2B:
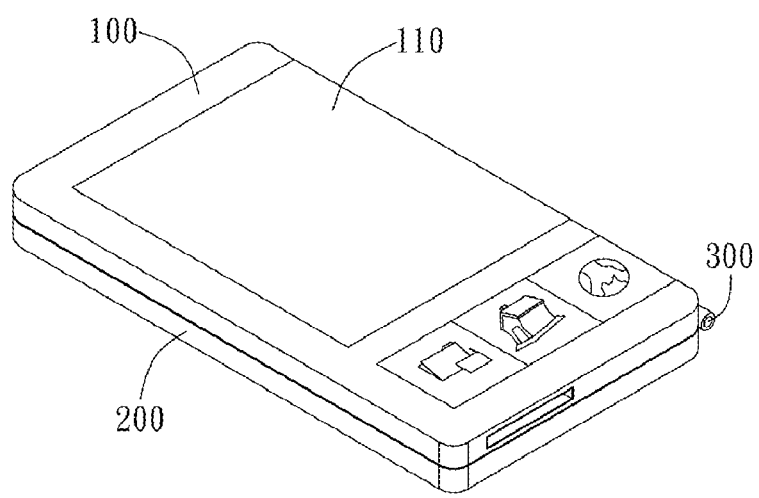
FIG. 2B is a schematic view of the display device of FIG. 2A in a closed configuration.

As shown in the embodiment of FIG. 2A and FIG. 2B, the display device includes a first housing 100 and a second housing 200. The first housing 100 and the second housing 200 are preferably disposed side by side and connected by a pivot 300 so that the first housing 100 and the second housing 200 can change the relative position with respect to each other. The pivot 300 is preferably a hinge. However, in other embodiments, the pivot 300 can be employed in other form. For instance, a foldable plastic sheet can be a substitute of the hinge to serve as the pivot 300. Besides, the pivot 300 can be omitted so that the first housing 100 and the second housing 200 are independent and merely disposed side by side without connection.

The first housing 100 and the second housing 200 have a first display screen 110 and a second display screen 210, respectively. The first display screen 110 and the second display screen 210 can display images individually. As shown in FIG. 2A, when the first housing 100 and the second housing 200 are disposed side by side in an open configuration, the first display screen 110 and the second display screen 210 are consequently disposed side by side to form an integrated display screen capable of displaying a larger image cooperatively. When the first housing 100 and the second housing 200 are folded in a closed configuration, as shown in FIG. 2B, the first display screen 110 and the second display screen 210 are separated to display two separate images.

Figure 3:
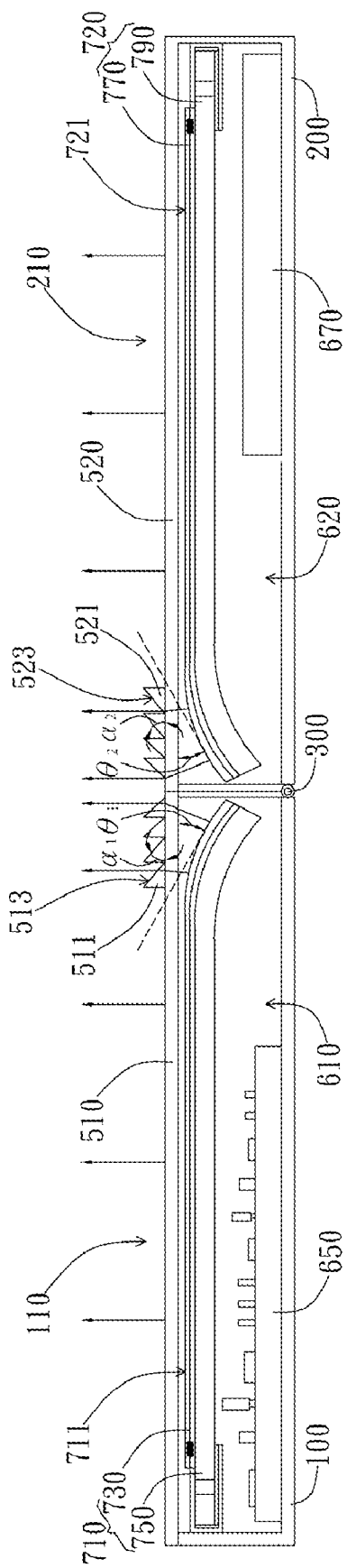
FIG. 3 is a schematic cross-sectional view of an embodiment of the display device of the present invention.

In the embodiment as shown in FIG. 3, the display device includes a first prism sheet 510, a second prism sheet 520, a first display module 710, and a second display module 720. The first prism sheet 510 is preferably disposed on the first display screen 110 while the first display module 710 is disposed in the first housing 100 and beneath the first prism sheet 510. The first display module 710 is preferably a liquid crystal display (LCD) module. However, a display module constituted of organic light emitting diode (OLED) panel or other type of display panel can be employed as the first display module 710. As shown in FIG. 3, the first display module 710 has a first display surface 711. Images can be displayed on the first display surface 711. The display beams are emitted from the first display screen 110 for users' viewing.

The second prism sheet 520 is preferably disposed on the second display screen 210 while the second display module 720 is disposed in the second housing 200 and beneath the second prism sheet 520. The second display module 720 is preferably a LCD module. However, a display module constituted of organic light emitting diode (OLED) panel or other type of display panel can be employed as the second display module 720. As shown in FIG. 3, the second display module 720 has a second display surface 721. Images can be displayed on the second display surface 721. The display beams are emitted from the second display screen 210 for users' viewing. However, in other embodiments, the first prism sheet 510, the second prism sheet 520, the first display module 710, and the second display module 720 can be disposed in a same housing.

As shown in FIG. 3, in one embodiment, at least a portion of the first display surface 711 close to the second prism sheet 520 is preferably inclined toward the second prism sheet 520 to form a downwardly curved surface. In other words, the normal line of the inclined portion of the first display surface 711 is inclined toward the second housing 200. The inclined portion of the first display surface 711 forms a first angle $\theta_1$ with respect to the first prism sheet 510, wherein the first angle $\theta_1$ is preferably between 10 degrees and 70 degrees. In this embodiment, the first display module 710 preferably includes a first LCD panel 730 and a first backlight module 750 disposed parallel to each other. However, in other embodiments, the first display module 710 can be constituted of other type of display panel such as OLED display panel. As shown in FIG. 3, at least a portion of the first LCD panel 730 and at least a portion of the first backlight module 750 close to the second prism sheet 520 are curved downwardly to form the first angle $\theta_1$ with respect to the first prism sheet 510.

As shown in FIG. 3, in one embodiment, at least a portion of the second display surface 721 close to the first prism sheet 510 is preferably inclined toward the first prism sheet 510 to form a downwardly curved surface. In other words, the normal line of the inclined portion of the second display surface 721 is inclined toward the first housing 100. The inclined portion of the second display surface 721 forms a second angle $\theta_2$ with respect to the second prism sheet 520, wherein the second angle $\theta_2$ is preferably between 10 degrees and 70 degrees. In this embodiment, the second display module 720 preferably includes a second LCD panel 770 and a second backlight module 790 disposed parallel to each other. However, in other embodiments, the second display module 720 can be constituted of other type of display panel such as OLED display panel. As shown in FIG. 3, at least a portion of the second LCD panel 770 and at least a portion of the second backlight module 790 close to the first prism sheet 510 are curved downwardly to form the second angle $\theta_2$ with respect to the second prism sheet 520.

Since the portion of the first display surface 711 close to the second prism sheet 520 is inclined toward the second prism sheet 520 and the second display screen 210, the display beams from the portion are also inclined toward the second display screen 210 along the direction of the normal line. When the inclined display beams reach the first prism sheet 510, the first prism sheet 510 direct the inclined display beams back to an angle close to the direction of the normal line of the first prism sheet 510 through refraction. Likewise, since the portion of the second display surface 721 close to the first prism sheet 510 is inclined toward the first prism sheet 510 and the first display screen 110, the display beams from the portion are also inclined toward the first prism sheet 510 along the direction of the normal line. When the inclined display beams reach the second prism sheet 520, the second prism sheet 520 direct the inclined display beams back to an angle close to the direction of the normal line of the second prism sheet 520 through refraction. Through this design, the border between the first display module 710 and the second display module 720 can be minimized to centralize the images displayed on the first display surface 711 and the second display surface 721, so as to reduce the obstruction to users' viewing.

As shown in the embodiment of FIG. 3, a plurality of first prisms 511 are formed on the upper surface of the first prism sheet 510. As shown in FIG. 3, the first prisms 511 are preferably disposed on a portion of the first prism sheet 510 close to the second prism sheet 520. However, in other embodiments, the first prisms 511 can be disposed on the entire surface of the first prism sheet 510, and the density or the size of their cross-section can be identical or different as the distance with respect to the second prism sheet 520 is varied. The first prism 511 has a first refraction surface 513 facing the second prism sheet 520, wherein at least a portion of the first refraction surface 513 close to the second prism sheet 520 has a first inclined angle $\alpha_1$ with respect to the first prism sheet 510. In one embodiment, the first inclined angle $\alpha_1$ is larger than the first angle $\theta_1$ and is between 15 degrees and 75 degrees. As shown in FIG. 3, the first prism 511 is preferably formed as a right-angled triangular prism which has a right-angled triangular cross-section, wherein the longer side of the cross-section (e.g. the hypotenuse) forms the first refraction surface 513 which faces the second prism sheet 520.

Likewise, a plurality of second t prisms 521 are formed on the upper surface of the second prism sheet 520. As shown in FIG. 3, the second prisms 521 are preferably disposed on a portion of the second prism sheet 520 close to the first prism sheet 510. However, in other embodiments, the second prism 521 can be disposed on the entire surface of the second prism sheet 520, and the density and the size of their cross-section can be identical or different as the distance with respect to the first prism sheet 510 is varied. The second prism 521 has a second refraction surface 523 facing the first prism sheet 510, wherein at least a portion of the second refraction surface 523 close to the first prism sheet 510 forms a second angle $\alpha_2$ with respect to the second prism sheet 520. In one embodiment, the second inclined angle $\alpha_2$ is larger than the second angle $\theta_2$ and is between 15 degrees and 75 degrees. As shown in FIG. 3, the second prism 521 is preferably formed as a right-angled triangular prism which has a right-angled triangular cross-section, wherein the longer side of the cross-section (e.g. the hypotenuse) forms the second refraction surface 523 which faces the first prism sheet 510. Through the disposition of the first prism 511 and the second prism 521, the beams emitted from the inclined first display surface 711 and the inclined second display surface 721 can be refracted to enhance the display effect.

In one embodiment, the first inclined angle $\alpha_1$ and the first angle $\theta_1$ must satisfy a relationship given by:

$$n \cdot \sin\left(\alpha_1 - \sin^{-1}\left[\frac{\sin\theta_1}{n}\right]\right) = \sin\alpha_1$$

wherein $\alpha_1$ is the first inclined angle, $\theta_1$ is the first angle, and n is a refractive index of the first prism 511. The second inclined angle $\alpha_2$ and the second angle $\theta_2$ must satisfy a relationship given by:

$$n \cdot \sin\left(\alpha_2 - \sin^{-1}\left[\frac{\sin\theta_2}{n}\right]\right) = \sin\alpha_2$$

wherein $\alpha_2$ is the second inclined angle, $\theta_2$ is the second angle, and n is a refractive index of the second prism 521.

It should be noted that the first angle $\theta_1$ can be equal to the second angle $\theta_2$, but not limited thereto. Likewise, the first inclined angle $\alpha_1$ can be equal to the second inclined angle $\alpha_2$, but not limited thereto.

In the embodiment as shown in FIG. 3, the first display module 710 includes the first LCD panel 730 and the first backlight module 750, wherein the first display surface 711 is formed on the first LCD panel 730. A portion of the first LCD panel 730 and a portion of the first backlight module 750 close to the second prism sheet 520 are inclined to form the first angle $\theta_1$ with respect to the first prism sheet 510, so that an end of the first surface 711 is inclined toward the second prism sheet 520. In one embodiment, an edge type backlight module is employed as the first backlight module 750. Consequently, a light guide plate is disposed beneath the first LCD panel 730, wherein an end of the light guide plate close to the second prism sheet 520 is inclined while the other end far from the second prism sheet 520 is disposed with a light source. However, in other embodiments, a direct type backlight module can be employed. Likewise, the second display module 720 can include the second LCD panel 770 and the second backlight module 790 which parallelly overlap with each other. A portion of the second LCD panel 770 and a portion of the second backlight module 790 close to the first prism sheet 510 are inclined to form the second angle $\theta_2$ with respect to the second prism sheet 520. The second display module 720 is preferably disposed symmetrical to and in a manner similar to the first display module 710. However, in other embodiments, the first display module 710 and the second display module 720 can have different designs or are not disposed symmetrical to each other.

Furthermore, as shown in FIG. 3, since a portion of the first display module 710 close to the second housing 200 is curved downwardly, a space is kept between the backside of the first display module 710 and the bottom of the first housing 100 to accommodate the curved portion of the first display module 710. In other words, the back side of the first display module 710 and the inner side of the first housing 100 enclose an accommodation space 610 therebetween. The accommodation space 610 is preferably formed as a columnar or dish-shaped space which has a wedge-shaped cross-section while triangular column or other geometric shape is also acceptable. In one embodiment, the accommodation space 610 can accommodate a circuit component 650, a battery, or other components. Likewise, the back side of the second display module 720 and the inner side of the second housing 200 enclose an accommodation space 620 therebetween. The accommodation space 620 is preferably formed as a columnar or dish-shaped space which has a wedge-shaped cross-section while triangular column or other geometric shape is also acceptable. In one embodiment, the accommodation space 620 can accommodate a circuit component 670, a battery, or other components.

Figure 4:
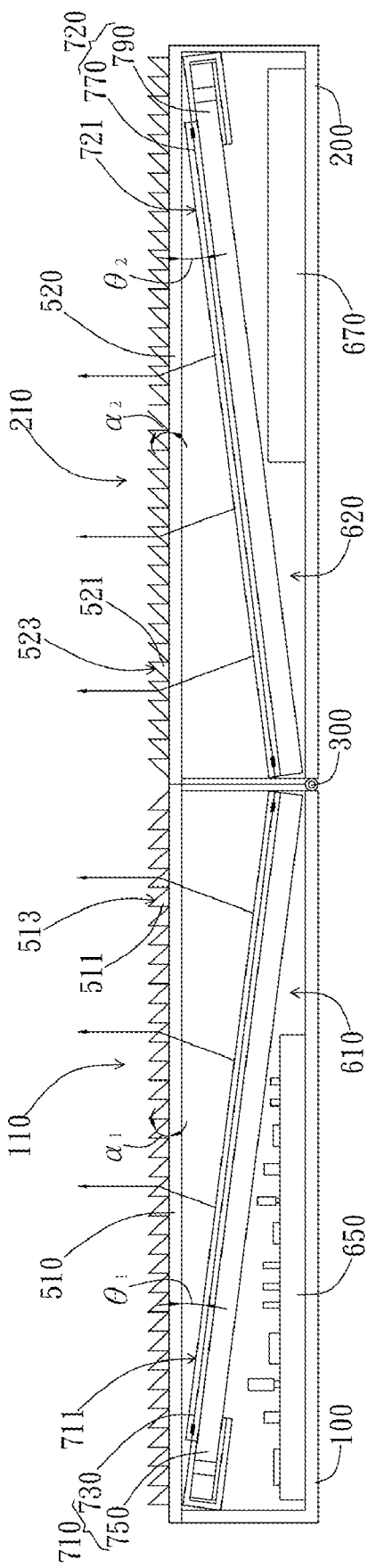
FIG. 4 is a schematic cross-sectional view of another embodiment of the display device of the present invention.

In the embodiment as shown in FIG. 4, the first display module 710 is formed as a plate so that the first display surface 711 thereon is formed as a planar surface instead of a curved surface. The first display module 710 is obliquely disposed in the first housing 100, so that the entire first display surface 711 is inclined to form the first angle $\theta_1$ with respect to the first prism sheet 510. Consequently, an accommodation space 610 formed beneath the first display module 710 has a triangular cross-section which can therefore accommodate the circuit component 650 or other components. Likewise, the second display module 720 can be disposed in a similar manner so that the second display surface 721 is a planar surface and entirely obliquely disposed. However, in other embodiments, the first display module 710 and the second display module 720 can be inclined or curved asymmetrically. Furthermore, in this embodiment, the first prisms 511 on the first prism sheet 510 are evenly disposed on the entire surface of the first prism sheet 510. However, in other embodiments, the first prisms 511 can have different density at different portions of a portion of the first prism sheet 510 or at different portions of the entire first prism sheet 510. The second prisms 521 on the second prism sheet 520 can be disposed in a similar manner.

Figure 5A:
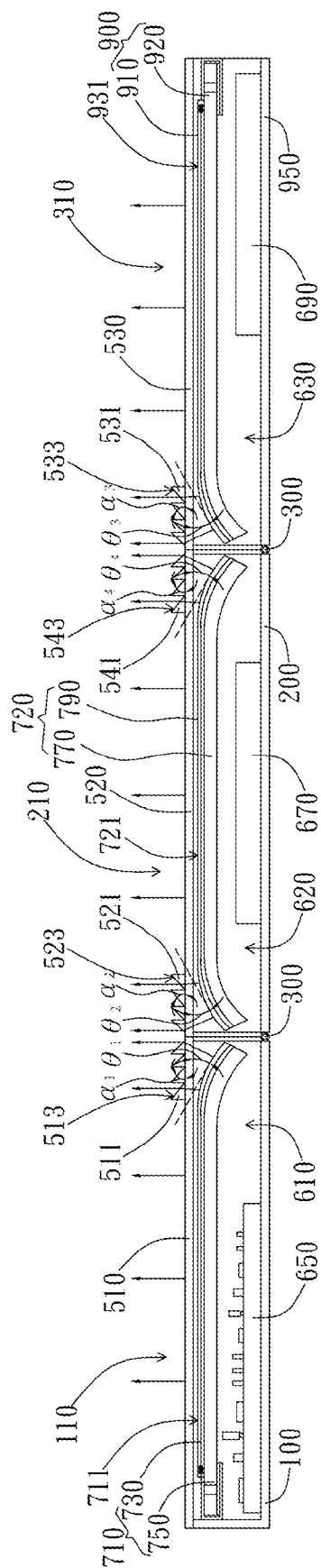
FIG. 5A is a schematic cross-sectional view of yet another embodiment of the display device of the present invention.
Figure 5B:
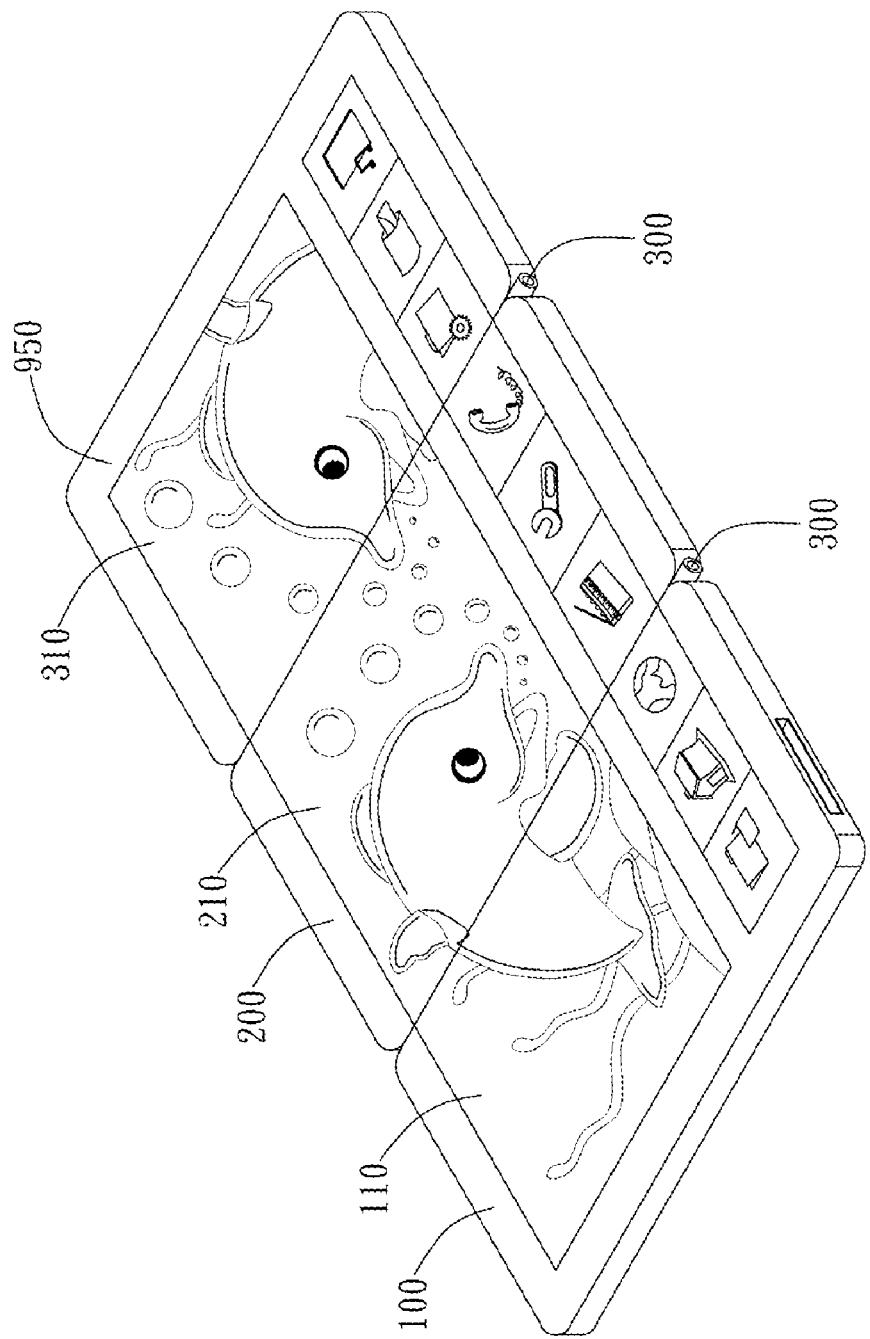
FIG. 5B is a schematic perspective view of the display device of FIG. 5A.

As shown in FIG. 5A and FIG. 5B, the display device further includes a third housing 950. The third housing 950 and the second housing 200 are preferably disposed parallel to each other, and the pivot 300 is employed to connect the third housing 950 and the second housing 200 so that their relative position can be changeable. The pivot 300 is preferably a hinge. However, in other embodiments, the pivot 300 can be employed in other form. For instance, a foldable plastic sheet can be a substitute of the hinge to serve as the pivot 300. Besides, the pivot 300 can be omitted so that the third housing 950 and the second housing 200 are independent and merely disposed side by side without connection.

The third housing 950 has a third display screen 310 which can display images. As shown in FIG. 5A and FIG. 5B, when the first housing 100, the second housing 200, and the third housing 950 are disposed side by side in an open configuration, the first display screen 110, the second display screen 210, and the third display screen 310 are consequently disposed side by side to form an integrated display screen capable of displaying a larger image cooperatively. Besides, through the disposition of the pivot 300, the second housing 200 and the third housing 950 can be selectively folded in a closed configuration.

As shown in FIG. 5A, a third display module 900 and a third prism sheet 530 are disposed in the third housing 950. The third prism sheet 530 is preferably disposed on the third display screen 310 while the third display module 900 is disposed in the third housing 950 and behind the third prism sheet 530. The third display module 900 preferably includes a third display panel 910 and a third backlight module 920 which are disposed parallel to each other. The third display module 910 is preferably a liquid crystal display (LCD) module. However, a display module constituted of organic light emitting diode (OLED) panel or other type of display panel can be employed as the third display module 910. As shown in FIG. 5A, the third display module 900 has a third display surface 931. Images can be displayed on the third display surface 931. The display beams are emitted from the third display screen 310 for users' viewing.

As shown in FIG. 5A, in one embodiment, at least a portion of the third display surface 931 close to the second prism sheet 520 is inclined toward the second prism sheet 520 to form a downwardly curved surface. In other words, the normal line of the inclined portion of the third display surface 931 is inclined toward the second housing 200. The inclined portion of the third display surface 931 forms a third angle $\theta_3$ with respect to the third prism sheet 530, wherein the third angle $\theta_3$ is preferably between 10 degrees and 70 degrees. The back side of the third display module 900 and the inner side of the third housing 950 enclose an accommodation space 630 therebetween. The accommodation space 630 is preferably formed as a columnar or dish-shaped space which has a wedge-shaped cross-section while triangular column or other geometric shape is also acceptable. In one embodiment, the accommodation space 630 can accommodate a control module 690, a battery, a circuit component, or other components.

As shown in FIG. 5A, a plurality of third prisms 531 are formed on the upper surface of the third prism sheet 530. The third prism 531 has a third refraction surface 533 facing the second prism sheet 520, wherein at least a portion of the third refraction surface 533 close to the second prism sheet 520 forms a third inclined angle $\alpha_3$ with respect to the third prism sheet 530. The relationship between the third angle $\theta_3$ and the third inclined angle $\alpha_3$ is similar to the relationship between the first angle $\theta_1$ and the first inclined angle $\alpha_1$ and detailed descriptions thereof are omitted for simplicity.

Furthermore, as shown in FIG. 5A, in one embodiment, at least a portion of the second display surface 721 close to the third prism sheet 530 is inclined toward the third prism sheet 530 to form a downwardly curved surface. In other words, the normal line of the inclined portion of the second display surface 721 is inclined toward the third housing 950. The inclined portion of the second display surface 721 forms a fourth angle $\theta_4$ with respect to the second prism sheet 520, wherein the fourth angle $\theta_4$ is preferably between 10 degrees and 70 degrees.

As shown in FIG. 5A, a plurality of fourth prisms 541 are formed on the second prism sheet 520 at the portion close to the third prism sheet 530. The fourth prism 541 has a fourth refraction surface 543 facing the third prism sheet 530, wherein at least a portion of the fourth refraction surface 543 close to the third prism sheet 530 forms a fourth inclined angle $\alpha_4$ with respect to the second prism sheet 520. In other words, the second refraction surface 523 of the second prism 521 and the fourth refraction surface 543 of the fourth prism 541 are opposite to each other and face different directions. The relationship between the fourth angle $\alpha_4$ and the fourth inclined angle $\alpha_4$ is similar to the relationship between the second angle $\theta_2$ and the second inclined angle $\alpha_2$ and detailed descriptions thereof are omitted for simplicity.

Although the present invention has been described through the above-mentioned related embodiments, the above-mentioned embodiments are merely the examples for practicing the present invention. What need to be indicated is that the disclosed embodiments are not intended to limit the scope of the present invention. On the contrary, the modifications within the essence and the scope of the claims and their equivalent dispositions are all contained in the scope of the present invention.

What is claimed is:

1. A display device, comprising:
   a first prism sheet;
   a second prism sheet disposed side by side with the first prism sheet;
   a first display module, disposed beneath the first prism sheet, having a first display surface, wherein at least a portion of the first display surface close to the second prism sheet is inclined toward the second prism sheet and forms a first angle with respect to the first prism sheet; and
   a second display module, disposed beneath the second prism sheet, having a second display surface, wherein at least a portion of the second display surface close to the first prism sheet is inclined toward the first prism sheet and forms a second angle with respect to the second prism sheet.

2. The display device of claim 1, wherein the first prism sheet has a plurality of first prisms formed on the upper surface of the first prism sheet, at least a portion of the first prism has a first refraction surface facing the second prism sheet.

3. The display device of claim 2, wherein a first inclined angle exists between the first refraction surface and the first prism sheet, the first inclined angle is larger than the first angle.

4. The display device of claim 3, wherein the first inclined angle is between 15 degrees and 75 degrees.

5. The display device of claim 4, wherein the first angle is between 10 degrees and 70 degrees.

6. The display device of claim 4, wherein the first inclined angle and the first angle satisfy a relationship given by:

$$n \cdot \sin\left(\alpha_1 - \sin^{-1}\left[\frac{\sin\theta_1}{n}\right]\right) = \sin\alpha_1$$

wherein $\alpha_1$ is the first inclined angle, $\theta_1$ is the first angle, and n is a refractive index of the first prism.

7. The display device of claim 2, wherein the second prism sheet has a plurality of second prisms formed on the upper surface of the second prism sheet, at least a portion of the second prism has a second refraction surface facing the first prism sheet.

8. The display device of claim 7, wherein a second inclined angle exists between the second refraction surface and the second prism sheet, the second inclined angle is larger than the second angle.

9. The display device of claim 8, wherein the second inclined angle is between 15 degrees and 75 degrees.

10. The display device of claim 9, wherein the second angle is between 10 degrees and 70 degrees.

11. The display device of claim 9, wherein the second inclined angle and the second angle satisfy a relationship given by:

$$n \cdot \sin\left(\alpha_2 - \sin^{-1}\left[\frac{\sin\theta_2}{n}\right]\right) = \sin\alpha_2$$

wherein $\alpha_2$ is the second inclined angle, $\theta_2$ is the second angle, and n is a refractive index of the second prism.

12. The display device of claim 1, wherein the first display surface is a planar surface inclined to form the first angle with respect to the first prism sheet.

13. The display device of claim 1, wherein the first display surface is a curved surface.

14. The display device of claim 1, wherein the first display module includes a first liquid crystal display (LCD) panel and a first backlight module disposed parallel to each other, the first LCD panel has the first display surface, at least a portion of the first LCD panel and at least a portion of the first backlight module close to the second prism sheet are inclined, the inclined portions of the first LCD panel and the first backlight module form the first angle with respect to the first prism sheet.

15. The display device of claim 14, wherein the second display module includes a second LCD panel and a second backlight module disposed parallel to each other, the second LCD panel has the second display surface, at least a portion of the second LCD panel and at least a portion of the second backlight module close to the first prism sheet are inclined, the inclined portions of the second LCD panel and the second backlight module form the second angle with respect to the second prism sheet.

16. The display device of claim 1, further comprising:
a first housing having a first display screen, wherein the first display module is disposed in the first housing, the first prism sheet is disposed on the first display screen; and
a second housing disposed side by side with the first housing, the second housing having a second display screen disposed side by side with the first display screen, wherein the second display module is disposed in the second housing, the second prism sheet is disposed on the second display screen.

17. The display device of claim 16, wherein the back side of the first display module and the inner side of the first housing enclose a wedge-shaped accommodation space therebetween.

18. The display device of claim 16, further comprising a pivot connected between the first housing and the second housing, so that the first display screen and the second display screen can be selectively disposed side by side in an open configuration or folded in a closed configuration.

19. The display device of claim 1, further comprising:
a third prism sheet disposed side by side with the second prism sheet, wherein the first prism sheet and the third prism sheet are disposed on two sides of the second prism sheet, respectively; and
a third display module, disposed beneath the third prism sheet, having a third display surface, wherein at least a portion of the third display surface close to the second prism sheet is inclined toward the second prism sheet and forms a third angle with respect to the third prism sheet;
wherein a portion of the second display surface close to the third prism sheet is inclined toward the third prism sheet and forms a fourth angle with respect to the second prism sheet.

20. The display device of claim 19, further comprising:
a first housing having a first display screen, wherein the first display module is disposed in the first housing, the first prism sheet is disposed on the first display screen;
a second housing disposed side by side with the first housing, the second housing having a second display screen disposed side by side with the first display screen, wherein the second display module is disposed in the second housing, the second prism sheet is disposed on the second display screen; and
a third housing disposed side by side with the second housing, wherein the first prism sheet and the third prism sheet are respectively disposed on two sides of the second prism sheet, the third housing has a third display screen, the third display module is disposed in the third housing, the third prism sheet is disposed on the third display screen.

21. The display device of claim 20, further comprising:
a first pivot connected between the first housing and the second housing, so that the first display screen and the second display screen can be selectively disposed side by side in an open configuration or folded in a closed configuration; and
a second pivot connected between the second housing and the third housing, so that the second display screen and the third display screen can be selectively disposed side by side in an open configuration or folded in a closed configuration.

* * * * *